July 17, 1934.　　　　G. E. PHILLIPS　　　1,966,517
METHOD OF AND APPARATUS FOR MAKING ARMORED CABLE
Original Filed Dec. 12, 1931　　2 Sheets-Sheet 2
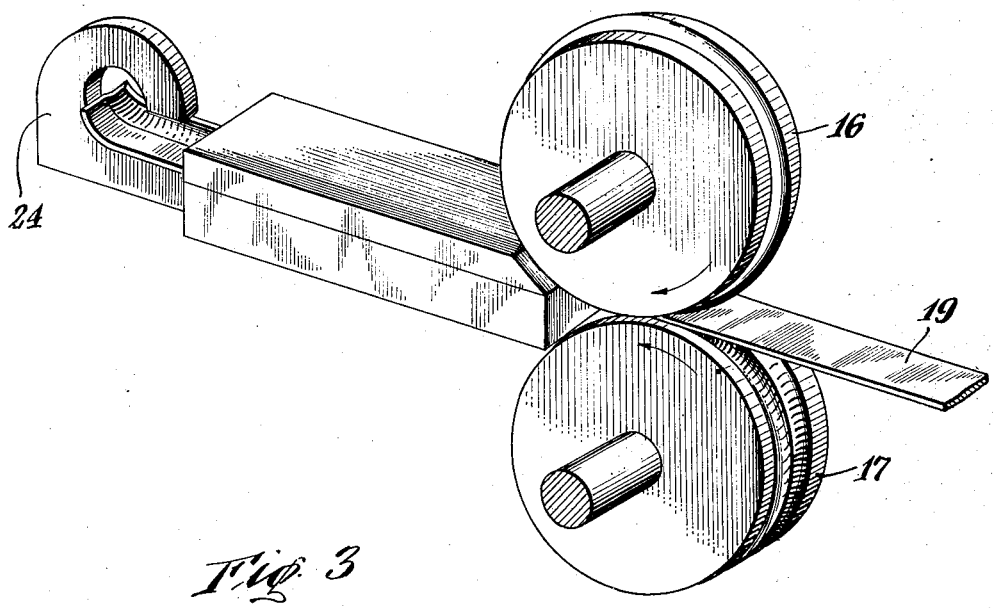
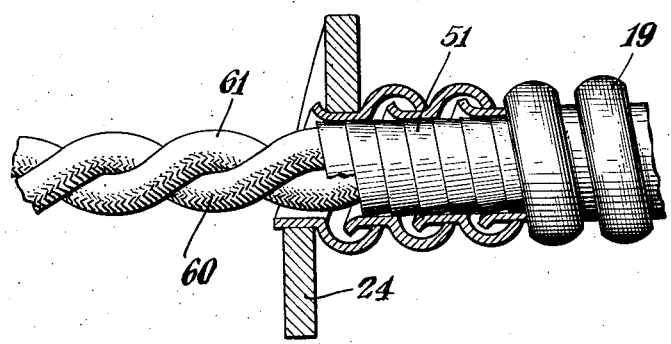
INVENTOR
George E. Phillips
BY
Cooper, Kent & Dunham
ATTORNEYS

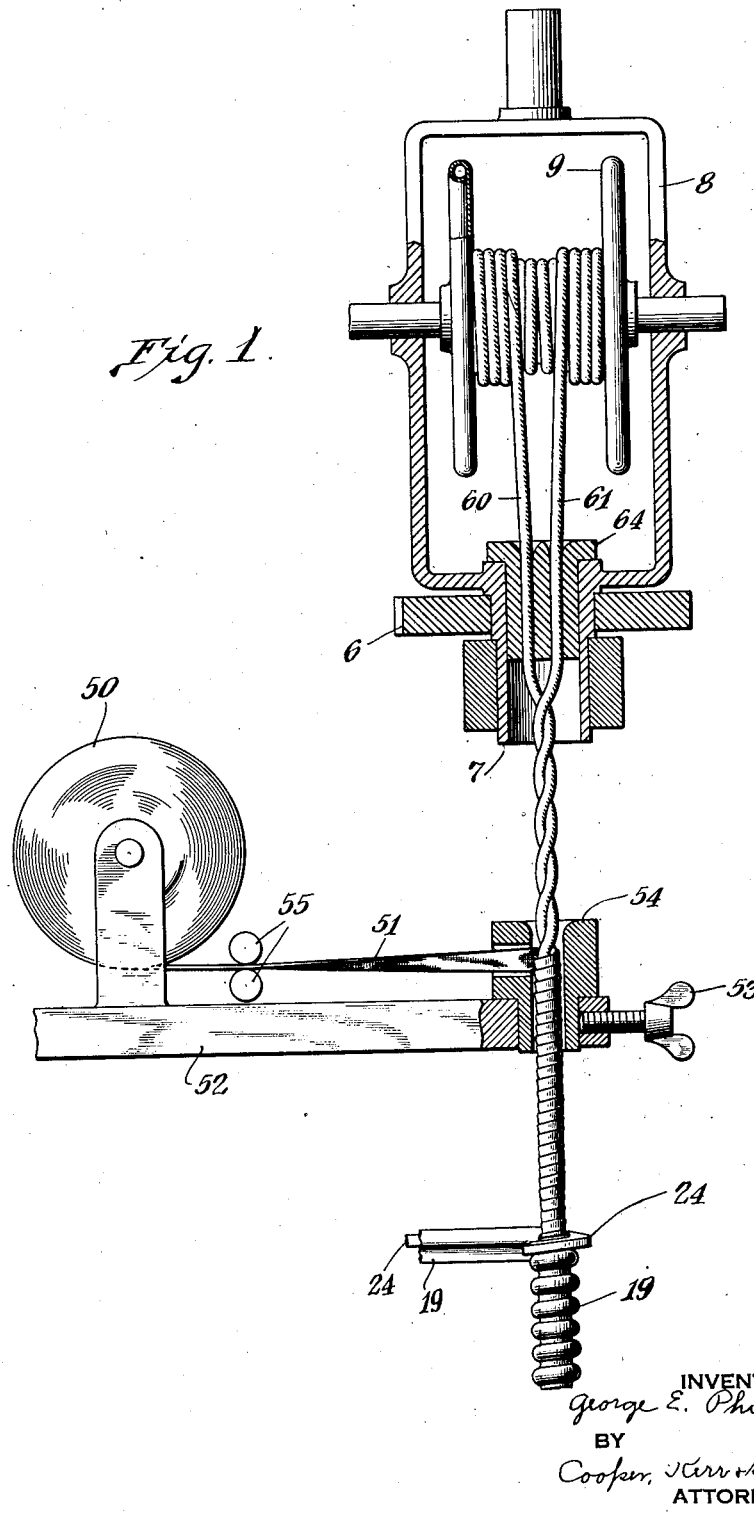

Patented July 17, 1934

1,966,517

UNITED STATES PATENT OFFICE

1,966,517

METHOD OF AND APPARATUS FOR MAKING ARMORED CABLE

George E. Phillips, Ben Avon, Pa., assignor to National Electric Products Corporation, New York, N. Y., a corporation of Delaware Application December 12, 1931, Serial No. 580,582
Renewed October 3, 1933

2 Claims. (Cl. 113—35)

This invention relates to the manufacture of flexible armored cable and the like, and has for its purpose, among other objects, to provide economical manufacture of such articles. Other objects and advantages will appear as the invention is hereinafter disclosed.

In Letters Patent of the United States No. 1,471,057, patented October 16, 1923, applied for by me on March 14, 1922, I disclosed a machine for armoring electric cables. In that machine, a flat strip of steel was passed from a reel through forming rolls which not only formed the flat steel strip into a desired cross-section but impelled it into a coiling die or coiler surrounding the cable to be armored, thereby applying to the cable a flexible, helical, metallic armor having interlocking turns. The application of the armor strip to the cable caused the cable to rotate about its longitudinal axis and to advance longitudinally through the coiling die or coiler. Thus the cited patent states: "the operation of forming the coils causes the product to rotate axially" and "The operation of thus armoring the cable serves to draw the unarmored cable continuously from the reel and to push the finished product continuously away." While, in the patented machine, the longitudinal advance of the cable produced by the application of the armor was used to draw the cable from the supply reel and to eject it from the coiling die or coiler, the rotation of the cable produced by the application of the armor was not employed for any useful purpose other than the application of the armor.

In the use of the patented machine, it was the practice to supply the armoring machine with a reel of cable composed of individually insulated conductors which had been pre-twisted and enclosed in a wrapper or enveloping tube or sleeve of braided material in separate machines. So used, due to the rotation of the cable produced by the application of the armor, it was necessary to rotate the supply reel about the longitudinal axis of the unreeled cable at the same angular velocity as that imparted to the cable by the armoring operation, so as not to impart twist, in the armoring machine, to the cabled conductors. To this end, there were provided in the patented machine, drive connections actuated by a common source of power and so designed as to cause the rotation of the supply reel (about the longitudinal axis of the unreeled cable) just to keep up with, or abreast of, so to speak, the rotation of the cable produced by the application of the armor. Thus, the patent states: "The connections are also proportioned that the speed of rotation of the reel-frame 8 about the axis of shaft 7 will be the same as the rate of travel of the strip which is applied to the cable.", and "because the operation of forming the coils causes the product to rotate axially, axial rotation is imparted to the unarmored cable by the means already described." It is therefore clear that the rotation of the cable about its longitudinal axis by the application of the armor was employed in the patented machine only incidentally to armoring and not for any other purpose.

According to the present invention, I not only use patented structure of my patented machine, but I utilize the rotation imparted to the cabled conductors by the application thereto of the armoring strip, to impart a desired twist to the conductors and to pull onto the so twisted conductors a strip of insulation and to cause it to wrap helically around the twisted conductors prior to armoring, all in the same single machine.

Because many structural features of my patented machine are employed in the machine herein illustrated, I use here the same reference numerals to indicate substantially the same parts as are there shown and described, and it may be here noted that the construction and operation of my apparatus herein disclosed are substantially the same as in my patented arrangement except in important respects noted in the preceding paragraph, and, hereinafter.

In the drawings, I have shown in Figure 1, in elevation, partly in section, what I now consider a preferred form of apparatus for practicing the invention, it being understood, of course, that other forms of apparatus may be employed to practice the invention within the scope of claims appended hereto.

Figure 2 is a perspective view on an enlarged scale of the forming and feeding rolls, guide and coiler.

Figure 3 is a detail sectional view of the coiler and product of Figures 1 and 2, with the paper wrapped conductors shown within the flexible armor.

I shall now first describe the features of construction and operation that are common to my patented machine and the machine herein disclosed.

The supply reel 9 is mounted for rotation in the frame 8 so as to permit unreeling of the conductors from the reel when pulled therefrom by the application of the armor. The frame 8 is mounted for rotation about the axis of its hollow extended portion or shaft 7 so as to permit the rotation of the conductors, which pay out through the said hollow shaft, to keep up with the rotation produced by the application of the armor, to such an extent as to prevent undesired twisting. The hollow shaft 7 has secured thereto a gear 6 which constitutes one of the drive elements (the remainder of which are not here shown) whereby the frame 8 and reel 9 are rotated about the axis of the shaft 7 from the same driving source (1, also not shown here), that is utilized to impel the armor strip into the coiling die or coiler.

The armor strip 19, preferably of steel, is fed from its supply reel, through forming rolls 16, 17, and thence into the coiling die or coiler 24, the forming rolls being actuated by the same driving source, to impel the armor strip, as is employed to rotate the frame 8 and reel 9 about the axis of the hollow shaft 7. The mounting of the armor strip supply reel, the construction of the forming rolls, the detailed construction of the coiling die or coiler 24, and the drive connections for the forming rolls may all be the same as the corresponding elements disclosed in my cited patent, or as in standard machines used for some time past, and some of these features are therefor omitted in the present drawings to avoid surplusage in illustration.

The construction and operation of the parts thus far described in detail and referred to by reference numerals in the foregoing description, are substantially the same as the construction and operation of the patented machine. But, whereas in the patented machine the gear 6 was rotated at the same angular velocity as that imparted to the cable by the application of the armor; according to the present invention the ratio of the gears employed to rotate the frame 8 about the axis of the hollow shaft 7 (one of which gears is shown at 6) is such as to cause the angular velocity of the frame 8 about the said axis of the shaft 7 to be less, by a predetermined amount, than the angular velocity imparted to the cable by the application of the armor strip. The purpose of this innovation is to impart the desired twist to the conductors in the armoring machine. This important feature will be referred to in more detail hereinafter.

According to the present invention, the rotation of the cable produced by the application of the armor is employed to pull onto the cable a strip of insulating material and to cause it to wrap helically around the cable. To this end, I provide a reel or roll 50 of insulating strip 51, preferably paper, the reel being mounted for rotation (so as to permit unreeling of the strip 51) upon a stationary bracket 52. The stationary bracket 52 has mounted therein and secured thereto, as by means of a set screw 53, a die 54 provided with an axial orifice, through which the cable passes from the supply reel 9 enroute to the coiling die 24, and with a radial orifice through which the strip 51 passes enroute to the cable. Preferably, a pair of stationary guides 55 are provided between which the strip 51 passes enroute to the die 54. It will be noted that the strip 51 turns longitudinally through an angle of about 90 degrees in its travel from its reel to the die 54.

In operation, the machine is supplied with a reel 9 of wire, consisting say of two individually insulated, but not pre-twisted, electrical conductors 60, 61, and these wires, and the strip 51, and the strip 19, are initially threaded, so to speak, into the machine. Each of the individual conductors 60, 61, is inserted through its individual opening 62, 63, provided in a wire guide 64 secured to the frame 8 and extending into the hollow shaft 7. The wire guide 64, so provided, prevents twisting of the conductors 60, 61 about each other on the reel 9; twisting takes place after the conductors leave the wire guide 64. When the parts have been hooked-up and power is applied to the machine, the armoring strip 19 is drawn from its reel by the forming rolls and impelled by them into the coiling die 24 where it coils around the cable to form the flexible, helical armor with interlocking turns (see Fig. 4). The winding of the metal strip 19 around the insulated conductors causes contact of the latter with the winding armor, and thereby corresponding rotation of the conductors about their longitudinal axis is caused, and such rotation of the conductors causes the simultaneous winding of the insulating material or strip 51 around the conductors. In other words, I cause the rotation of the conductors by and with the armor strip 19 to pull the strip 51 from its reel, through the guides 55, through the radial orifice of the die 54, and around the rotating cable or conductors. Simultaneously, the frame 8 is being rotated about the axis of the shaft 7 by the same power means that drives the armor-forming rolls, but such rotation of the frame 8 is at an angular velocity less than that imparted to cable by the armoring operation. This difference of speed of rotation causes a twist to be imparted to the conductors 60, 61, while they are traveling from the wire guide 64 to the die 54. By rotating the frame 8 (about the axis of the shaft 7) slower than the rotation of the cable at the armoring station, the rotation of the frame will be caused to lag behind the rotation of the cable by the application of the armor, and thus the angular velocity of the frame 8 is comparatively low, with attendant advantages. The rotation and longitudinal advance of the cable are produced by the application of the armor strip 19. The insulating strip 51 is pulled onto the cable by the rotation of the cable produced by the application of the armor strip 19 and the pitch of the overlapping helical turns of the insulation wrapping 51 will obviously be the same as that of the helical coils of the applied armor since the longitudinal advance of the cable is also produced by the application of the armor strip. The twist (i. e. the number of twists or turns produced per unit of length in the conductors 60, 61) is determined by two factors, i. e. (1) the rate of longitudinal advance of the cable, which is produced by the application of the armor, and (2) the difference between the angular velocity of the frame 8 (or wire guide 64 secured thereto) and the angular velocity of the cable produced by the application of the armor. This last mentioned difference in angular velocities is determined and controlled by suitably selecting the gear ratio between the common drive and the gear 6 with respect to the gear ratio between the common drive and the armor-forming rolls, so as to produce the desired twist. All of the forces applied to the cable or conductors to produce the desired longitudinal feed, twist, and to apply the insulation 51, are applied to the cable by and with the application of the armoring strip. If the frame 8 did not rotate at all, i. e. were held stationary, the twist would be a maximum. By causing the frame 8 to be rotated at less speed than that of rotation of the cable by the application of the armor strip, the frame 8 is permitted partially to lag behind, but not catch up with, the rotation of the cable produced by the application of the armor strip, and the desired twist is thus produced.

As stated, the application of the armor strip 19 not only rotates the cable but also causes longitudinal feed thereof, pulling the conductors 60, 61, from the reel 8, through the wire guide 64, through the die 54, into the coiling die or coiler 24, and ejecting the finished product from the coiler 24.

After the finished product has been thus automatically ejected from the coiler 24, it may be cut off at desired lengths, without stopping the machine, and collected in any desired way, the cutting off and/or collection forming no part of the present invention.

Features of invention claimed herein were disclosed by me in my copending application Serial No. 427,737, filed in the United States Patent Office on February 12, 1930.

Certain features of invention herein disclosed are claimed in my said copending application Serial No. 427,737.

What I claim is:

1. A machine for making flexible armored multi-conductor cable comprising, in combination, means for applying flexible, helical armor, with interlocking turns, to, in contact with, and around, an unarmored cable and, by the application of the armor simultaneously rotating said cable about its longitudinal axis and advancing it longitudinally, means supplying an insulating strip to the unarmored cable prior to armoring and causing the insulating strip to wrap helically around the cable by the rotation and longitudinal advance of the cable produced by the application of the armor, and means for rotating the conductors, prior to wrapping and armoring, at an angular velocity different from the angular velocity of the cable during wrapping and armoring.

2. The method of making flexible armored cable which comprises forming, impelling, and causing metallic armor strip helically to surround, with interlocking turns, wire including one or more individually insulated electrical conductors and thereby, by the application of the armor, to produce rotation and longitudinal advance of the wire, supplying, prior to armoring, paper strip to the rotating longitudinally advancing wire and causing the rotation and longitudinal advance of the wire, produced by the application of the armor strip, to wrap the paper strip helically around the wire prior to armoring, and prior to application of the paper strip, rotating the wire about its longitudinal axis at a rate different from that of the rotation produced by the application of the armor strip to such an extent as to produce desired twisting.

GEORGE E. PHILLIPS.